United States Patent [19]

Yoshioka et al.

[11] Patent Number: 5,495,383
[45] Date of Patent: Feb. 27, 1996

[54] CIRCUIT FOR PROTECTING ELECTRONIC EQUIPMENT FROM OVERVOLTAGE OR OVERCURRENT CONDITIONS

[75] Inventors: Naruo Yoshioka; Takaaki Ito; Takashi Kurihara, all of Yokoze, Japan

[73] Assignee: 501 Mitsubishi Mining & Cement Co., Ltd., Tokyo, Japan

[21] Appl. No.: 259,552

[22] Filed: Jun. 14, 1994

Related U.S. Application Data

[63] Continuation of Ser. No. 44,572, Apr. 6, 1993, abandoned, which is a continuation of Ser. No. 568,723, Aug. 17, 1990, abandoned.

[30] Foreign Application Priority Data

Aug. 21, 1989 [JP] Japan ................... 1-213062

[51] Int. Cl.⁶ ........................................ H02H 9/00
[52] U.S. Cl. ................... 361/56; 361/91; 361/118; 361/103
[58] Field of Search ........................ 361/119, 118, 361/91, 56, 58, 103

[56] References Cited

U.S. PATENT DOCUMENTS

| | | | |
|---|---|---|---|
| 3,448,341 | 9/1968 | Casey | 361/118 |
| 3,795,840 | 3/1974 | Cambra | 361/91 |
| 3,795,846 | 3/1974 | Ogawa et al. | 338/21 |
| 4,758,920 | 7/1988 | McCartney | 361/119 |
| 4,903,295 | 2/1990 | Shannon et al. | 379/437 |
| 4,907,120 | 3/1990 | Kaczmarek et al. | 361/119 |

FOREIGN PATENT DOCUMENTS

| | | | |
|---|---|---|---|
| 0186873 | 12/1985 | European Pat. Off. | H02H 9/04 |
| 6399725 | 10/1986 | Japan | H02H 9/06 |
| 63-205026 | 2/1987 | Japan | H01H 85/00 |
| 6477426 | 9/1987 | Japan | H02H 9/06 |

OTHER PUBLICATIONS

Casey L. O., NASA Technological Brief No. 96–B–10490, Fuse Protects Circuit from Voltage Current Overloads, Oct. 1969.

*Primary Examiner*—Marc S. Hoff
*Assistant Examiner*—S. Jackson
*Attorney, Agent, or Firm*—Hoffman, Wasson & Gitler

[57] ABSTRACT

A circuit for protecting a semiconductor circuit or a telephone communication line from a lightning surge or overvoltage or overcurrent condition. The circuit incorporates a two-terminal surge absorbing device arranged in parallel with the circuit or line to be protected, a thermistor having a high positive temperature coefficient, arranged in series to the circuit or line, between the electric source and the surge absorbing means, and a resistor connected in series with the circuit or line.

1 Claim, 2 Drawing Sheets

CIRCUIT FOR PROTECTING ELECTRONIC EQUIPMENT FROM OVERVOLTAGE OR OVERCURRENT CONDITIONS

This is a continuation of 08/044572 filed Apr. 6, 1993 which is a continuation of application Ser. No. 07/568,723 filed on Aug. 17, 1990, both abandoned.

FIELD OF THE INVENTION

The present invention relates to an electronic circuit for protecting a semiconductor circuit or a telephone line from a lightning surge and/or other overvoltage or overcurrent condition. Particularly, it relates to a circuit using a two-terminal surge adsorbing element, which can protect the semiconductor circuit or the telephone line from a lightning surge as well as from continuous overvoltage or overcurrent conditions.

DESCRIPTION OF THE PRIOR ART

In the past, there has been numerous types of circuits for protecting sensitive electronic equipment such as a semiconductor device, a communication line, e.g. a telephone, a telecopier, a CATV system and the like, from a lightning surge and/or an overvoltage or overcurrent condition. The prior protection circuits include a fuse or metallic wire of low melting temperature which is occasionally combined with an element for absorbing the surge such as a surge arrestor or varistor. When a surge caused by, for example, a lightning bolt, occurs, protection of the semiconductor circuit is attained by maintaining a voltage level below the response voltage of the surge absorbing element. The response voltage corresponds to a voltage for creating an electric discharge in the case of when an arrestor is used, and to a varistor voltage in the case where a varistor is used.

When a fuse is included in the protection circuit, upon the occurrence of an overvoltage or overcurrent condition, the fuse element is broken by the excess current connected to the fuse itself or by generation of heat in the surge absorbing element, such that the protection circuit opens, thereby protecting the semiconductor circuit or the communication line.

However, in order for the electronic equipment to be adequately protected against an overvoltage or an overcurrent condition, both the current rating of the fuse must be lower than the maximum current tolerance of the electronic equipment to be protected, and the voltage rating of the surge absorbing element must be commensurate with the maximum voltage tolerance of the electronic equipment to be protected.

Prior art protection circuits are also known to use a zener diode in combination with a surge absorbing element. The zener diode is normally connected in parallel to the circuit sought to be protected. However, by using a zener diode, all of the overcurrent seen is directed into the zener diode, and the surge absorbing element does not operate properly, thereby causing the zener diode to be overheated.

Heretofore, networks for protecting electronic equipment from overvoltage have employed a spark gap surge absorbing element to shunt the overvoltage and excessive currents from the input conductor to ground. Such networks further employed a series connected fuse for disconnecting or open circuiting the source of overvoltage or overcurrent from the equipment to be protected. Such a protective network is described in U.S. Pat. Nos. 3,448,341 and 3,795,846 and NASA Tech. Brief No. 69-10490, Oct. 1969.

Further, Japanese Patent Laid-open Publication Nos. 63-99625, 63-205026/1988 and 64-77426/1989 disclose a method of preventing overheating of a surge absorbing element included in a 600 VAC protective circuit, by opening the circuit with a meltable fuse, or by contacting a low-melting point metal wire against the surface of a microgap surge absorbing element so that the heat generated by an overvoltage or overcurrent condition will melt the low melting point metal wire, thereby opening the circuit.

In the prior art protective circuits, replacement of an expended fuse and/or a burned-out surge absorbing element was required and is also both time consuming and costly. Needless to say, upon the occurrence of an overvoltage or overcurrent condition, the semiconductor circuit or telephone line protected by the protective circuit cannot be used until burned-out surge absorbing element or at least the fuse is replaced.

SUMMARY OF THE INVENTION

With the foregoing considerations in mind, the present invention presents an improved circuit for protecting an electronic circuit from an overvoltage or an overcurrent condition.

Accordingly, it is an object of the present invention to provide a circuit for protecting a semiconductor circuit or a telephone line from a surge such as a lightning surge or an overvoltage or overcurrent condition.

It is another object of the present invention to provide a protection circuit which can protect without opening the protected circuit when a telephone line is faced with an overvoltage or overcurrent condition.

DETAILED DESCRIPTION OF PREFERRED EMBODIMENTS

The present protection circuit relies upon a two-terminal surge absorbing element, such as a microgap device. For the sake of discussion, the term surge absorbing element used throughout this application refers to a two-terminal microgap surge absorbing element, which may also be known in the art as a microgap surge suppressor, or by an equivalent terminology.

The two-terminal microgap device contemplated by the Applicants for use in their inventive circuit is selected for its particular direct current (DC) discharge voltage rating which is occasionally referred to as the breakdown voltage or by some other terminology. The DC discharge voltage rating which is proper for protecting the particular electronic equipment in question mandates the proper selection of microgap surge absorbing element.

In the preferred embodiment, the surge absorbing element is arranged in parallel with the equipment to be protected, and a thermistor is connected in series to both the equipment to be protected and the surge absorbing element, so as to form the inventive protection circuit. Therefore, upon the occurrence of an overvoltage or overcurrent condition, the instant protection circuit opens without relying upon any fuse or low melting point metal wire as in the prior art. In other words, the overcurrent flowing through the instant protection circuit is suppressed by operating the thermistor so as to avoid overheating and damaging of the protected equipment.

Applicants have found that the combination of the microgap surge absorbing element and the thermistor can adequately protect a semiconductor circuit or communication equipment against an overvoltage or overcurrent condition.

Although the surge absorbing element contemplated for the preferred embodiment is a microgap device, almost any two terminal components belonging to the same class of electronic components as, and having the same structure as, a microgap surge suppressor, would function properly in Applicants' protective circuit, so long as the voltage rating of the substitute device is comparable to the contemplated microgap surge suppressor.

Generally speaking, a thermistor of the type used in the inventive protection circuit is a thermo-sensing element whose resistance value drastically increases with an increase in the circumstantial temperature, i.e. a resistor having positive-temperature resistance coefficient characteristics. Thus, when the temperature of the thermistor rises, its resistance sharply increases such that the thermistor appears to have a switching property. Similarly, when excessive current flowing through the thermistor heats the thermistor so as to drastically increase the resistance value thereof, the thermistor in fact offers an extremely high resistance value to the current flow. The inventive protection circuit utilizes this switching feature of the thermistor.

Figure 1:
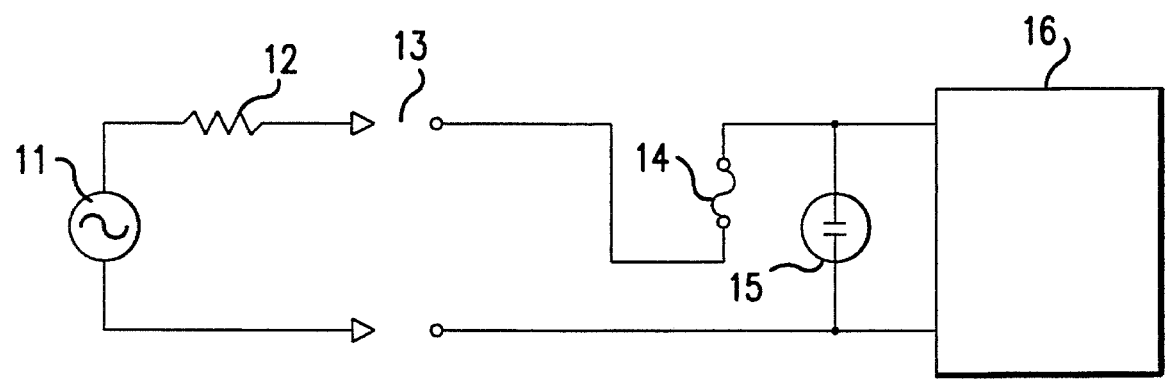
FIG. 1 shows schematically a prior art protection circuit.

FIG. 1 shows a typical prior art protection circuit, wherein an AC voltage source is shown as 11, a controlling resistor is shown as 12 and 13 represents electrical connection points. A low melting point wire 14 and a surge absorbing element 15 operably connect the protected equipment or load 16 from an adverse electrical condition supplied by the source 11.

Figure 2:
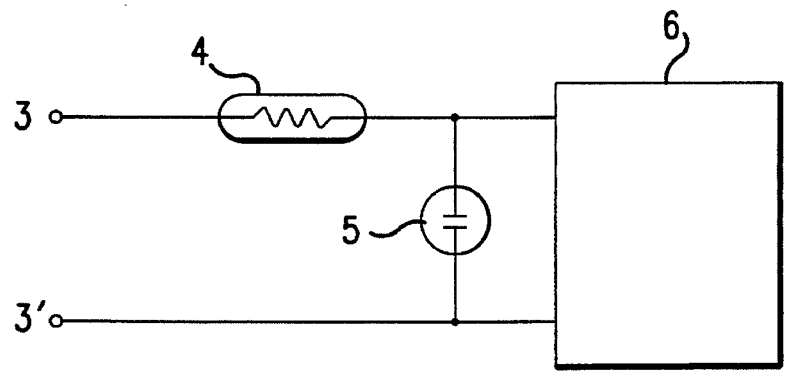
FIG. 2 shows schematically a protection circuit according to the present invention.

The protection circuit of the present invention is shown in FIG. 2. The two terminal surge absorbing element 5 is arranged in parallel with equipment to be protected 6, and a thermistor 45 is connected in series with the equipment to be protected 6. When an overvoltage (typically 600 volts AC) appears on the terminals 3, 3' of the inventive protective circuit, the surge absorbing element 5 is discharged, and at the same time, a high current (referred throughout as an overcurrent) created by the overvoltage, flows through the thermistor 4. The high current flowing through the thermistor 4, and then the current flowing through the surge absorbing element 5, will decrease or be controlled so as to suppress the current value below the current that causes overheating, thereby avoiding overheating and possible damage to the surge absorbing element 5 and also to the protected equipment 6.

The thermistor 4 preferably has a switching temperature of 60° C. to 165° C. Applicants have found that when the switching temperature is less than or equal to 65° C., the protection circuit can be operated at the use temperature of the equipment to be protected. When the switching temperature exceeds 165° C., the heat can adversely affect a semiconductor substrate of the protected semiconductor circuit device.

Furthermore, Applicants have found that the preferable thermistor 4 has a nominal zero charge resistance value lower than 1 Kilo ohm. When the nominal zero charge resistance value exceeds one Kilo ohm, excessive energy loss can occur, and a protected semiconductor or circuit protected equipment can be affected.

Figure 3:
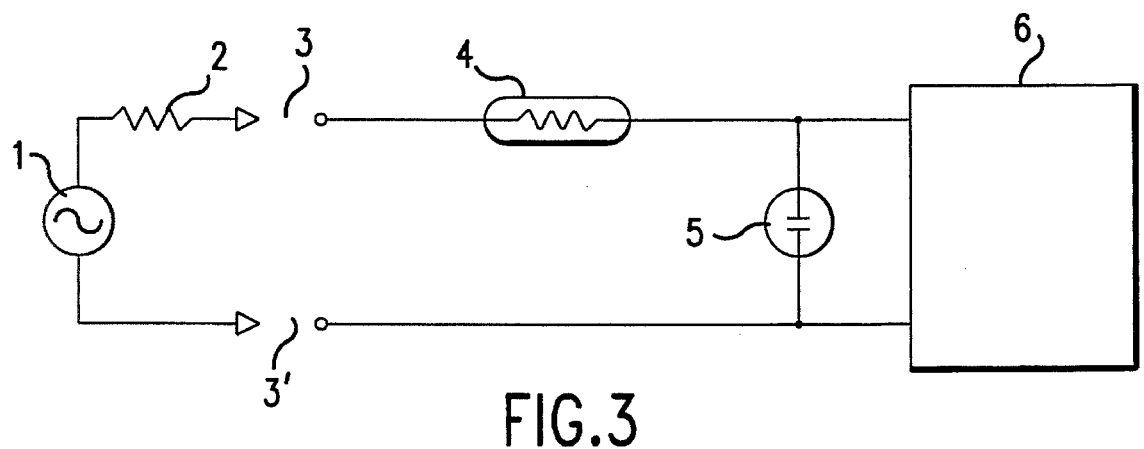
FIG. 3 shows schematically a voltage source and controlling resistor connected to the protection circuit of the present invention.

FIG. 3 shows another embodiment of the inventive protection circuit.

A surge absorbing element 5 having a direct current (DC) discharging voltage rating of 400 V is arranged in parallel with the equipment to be protected 6. A thermistor 4 having a nominal zero charging resistance of 8 ohm and a switching temperature of 80° C. is arranged in series to the telephone set 6 and the surge absorbing element 5.

A connector 3, 3' is provided to connect a voltage source 1, typically 600 VAC, through a controlling resistor 2 with the inventive protection circuit. The controlling resistor 2 has a typical resistance of 15 ohms.

The prior art protection circuit shown in FIG. 1 was compared to the inventive protective circuit shown in FIG. 3. The prior art protective circuit shown in FIG. 1 comprises a surge absorbing element 15 having a direct current (DC) discharging voltage of 400 V, connected with a low melting point melt wire 14 having a melting point of 410° C. An AC voltage source 11 is connected with a controlling resistor 12 of 15 ohm. The AC voltage source was 600 VAC.

Upon application of the AC voltage source 11 to the prior art protection circuit shown in FIG. 1, the low melting point wire fused at 35 milliseconds after application of the voltage from the source 11, and the circuit was opened without energizing the surge absorbing element 15.

For the inventive protection circuit shown in FIG. 3, the current value flowing through the surge absorbing element 5 decreased drastically from 1.7 A to 0.01 milliampere at about 20 milliseconds after application of voltage from the voltage source 1. Then, the voltage source 1 remained connected for 10 minutes without overheating or damage to the protected equipment 6. Further, after the voltage source 1 was disconnected, the function of the protective circuit elements, i.e., the thermistor 4 and the surge absorbing element 5 returned to their normal state without any change to their operating conditions or characteristics.

Figure 4:
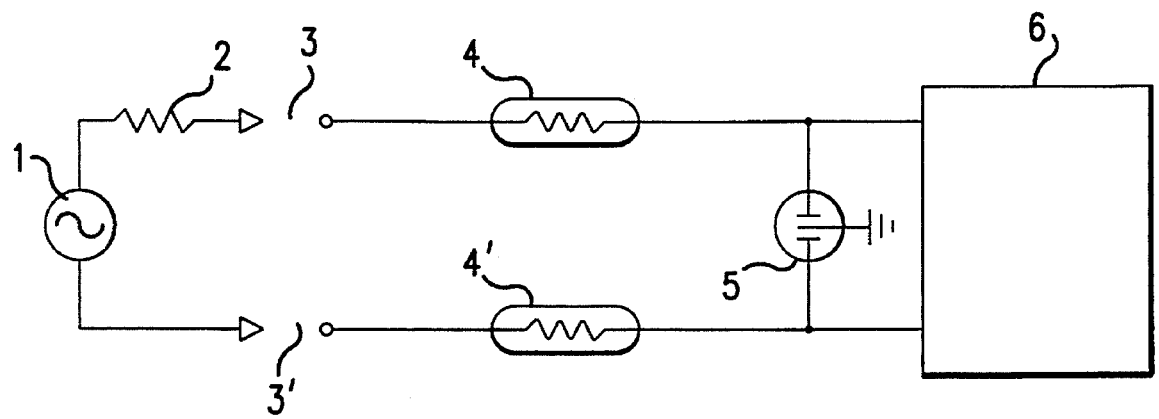
FIGS. 4 and 5 each show other embodiments of the protection circuit in accordance with the present invention.

FIG. 4 shows another embodiment of the inventive protection circuit, incorporating two thermistors 4, 4', and a microgap surge absorbing element 5. However, the surge absorbing element 5 used in this embodiment is provided with a ground terminal.

A connector 3, 3' is arranged to connect a voltage source 1 (typically 600 VAC) through a controlling resistor 2 with the inventive protection circuit. The controlling resistance 2 in typically 150 ohms.

Current created by an overvoltage condition flows separately through each of the thermistors 4, 4' and each of discharging passages in the surge absorbing element 5 to ground, via the central electrode of the surge absorbing element 5, so as to protect electronic equipment 6.

Further, after the overvoltage condition subsides, the function of the protection elements, i.e. the thermistors 4,4' and the surge absorbing element 5 returns to normal, and their characteristics have not been changed.

Applicants compared the prior art protection circuit shown in FIG. 1 with the embodiment of Applicants' inventive protection circuit shown in FIG. 4. This comparison involves the microgap surge absorbing element 15 having a direct current discharging voltage of 400 V adjacently provided with a low melting point melt wire 14 having a melting point of 410° C. The AC source 11 was connected to a controlling resistor of 275 ohm. The source 11 had a 600 V in maximum voltage.

Then voltage from source 11 was applied to the prior art protection circuit shown in FIG. 1, the low melting point wire fused at 2 to 3 seconds and the circuit was opened without firing of the surge absorbing element.

In the inventive protection circuit shown in FIG. 4, the current value flowing through the surge absorbing element 5 decreased drastically from 1.8 A to 0.005 milliamperes at about 0.5 seconds after applying the overvoltage and then the application continued for 10 minutes, but no overheating was found in the inventive protection circuit. Further, after the application continued for 30 minutes, and discontinued, the function of the protection circuit, i.e., the functions of the thermistors 4, 41 and the surge absorbing element 5 recovered and their characteristics were not changed.

The surge absorbing element 5, with a direct current discharging voltage of 400 V, is arranged in parallel to the protected equipment 6, and a positive thermistor 4 with nominal zero charging resistance of 8 ohm, and a switching temperature of 80° C. is arranged in series to the protected equipment 6 and the absorbing element 5.

Figure 5:
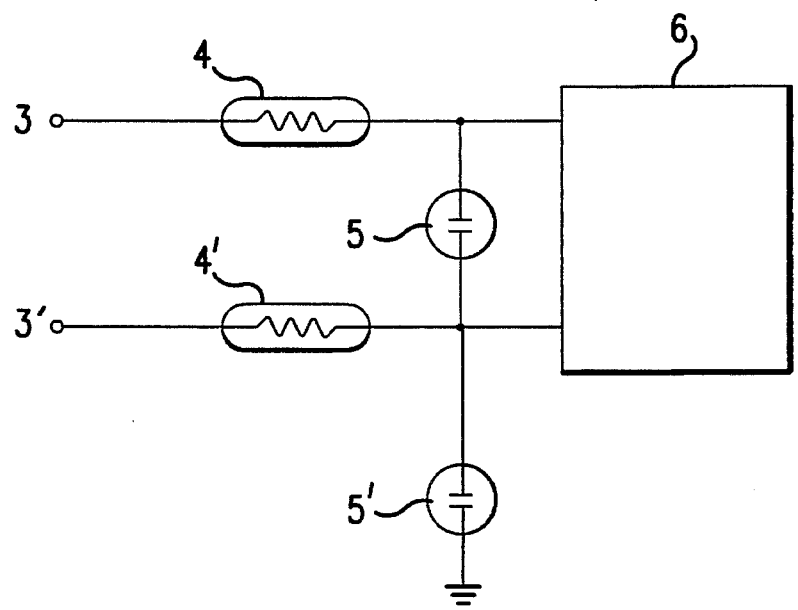

FIG. 5 shows yet another embodiment of the inventive protection circuit, incorporating two thermistors 4, 4' and two microgap surge absorbing elements 5, 5'. Each of the surge absorbing elements 5, 5' is a two-terminal device, such as incorporated into the other embodiments. One element 5 is connected parallel with the protected equipment 6 while the other element 5' is connected between the thermistor 4' and one side of the protected equipment 6, to ground.

In this embodiment, the current produced by an overvoltage condition can flow through each of the thermistors 4, 4' and the surge absorbing elements 5, 5' respectively.

The inventive protection circuit protects a communication line from both a lightning surge and an overvoltage or overcurrent condition, while providing the following significant effects:

Firstly, it restricts current created by an overvoltage condition;

Secondly, avoids overheating of the two-terminal surge absorbing element, and further avoids damage to the protected equipment;

Thirdly, the inventive protection circuit can protect equipment without opening the circuit, thus the protected equipment can be used immediately after the overvoltage subsides;

Further, the inventive protection circuit can be repeatedly used without having to exchange burned-out part(s), thereby providing a practical and economical protection circuit.

Still further, the inventive protection circuit provides both personnel and equipment protection from overvoltage and overcurrent conditions which exceed the fuse rating or the voltage rating of the two-terminal surge absorbing element. The simplicity of the present protection circuit results in a large cost reduction over other prior art devices. In addition, the present protection circuit is passive, thus it results in no need for calibration.

Although Applicants have herein disclosed the preferred embodiment of their invention, Applicants contend that changes and modifications which can be made to their invention, by persons skilled in the art to which the invention pertains, do not depart from the broader aspects of the invention as claimed. Therefore, the appended claims are intended to cover all such changes and modifications that fall within the spirit and scope of Applicants' invention.

We claim:

1. An electronic circuit for protecting a semiconductor device or communication line form an overvoltage or an overcurrent condition, including a two terminal microgap surge absorbing means electrically connected in parallel arrangement with the device or line, a thermally variable resistance means electrically connected in series with the device or line, said thermally variable resistance means being disposed between a source of electrical power and said surge absorbing means, said thermally variable resistance means having a switching temperature in the range from 65° C. to 165° C. and a nominal zero changing resistance value lower than 1 kilo-ohm, and a fixed resistance means electrically connected in series to said device or line at a location between said thermally variable resistance means and said source of electrical power.

* * * * *